Aug. 31, 1926.
A. BREISIG
1,598,473
COMPLETE GASIFICATION OF BITUMINOUS FUEL
Filed Sept. 25, 1922
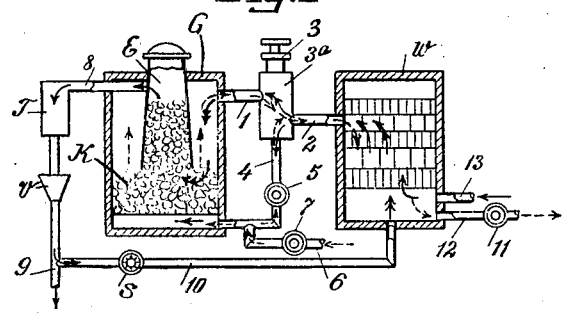
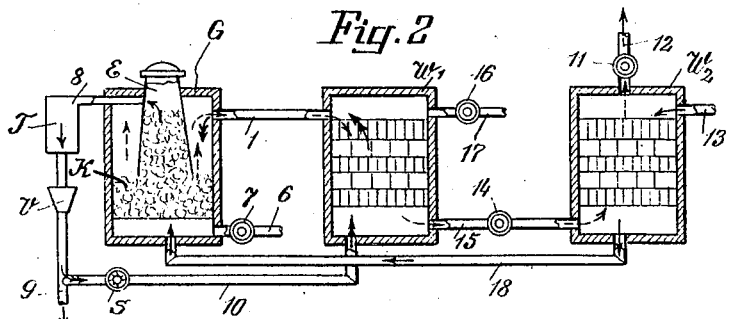
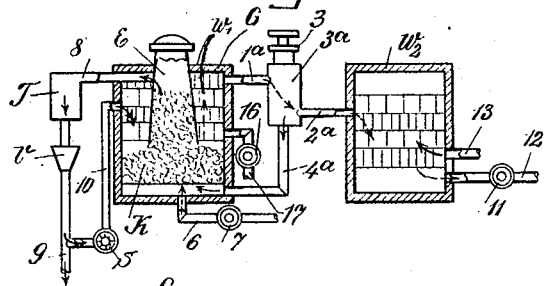
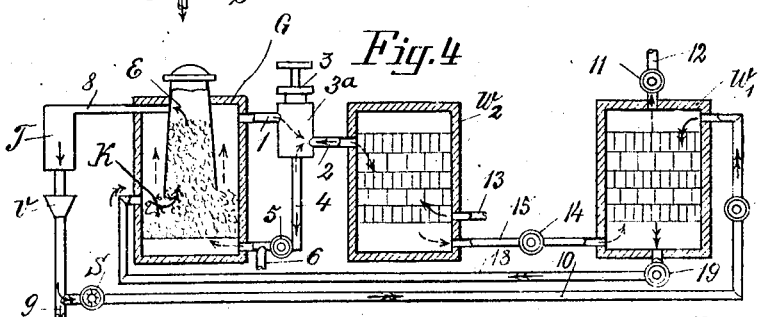
Inventor:
A. Breisig Patented Aug. 31, 1926.

1,598,473

UNITED STATES PATENT OFFICE.

ALBERT BREISIG, OF VIENNA, AUSTRIA.

COMPLETE GASIFICATION OF BITUMINOUS FUEL.

Application filed September 25, 1922, Serial No. 590,498, and in Austria May 25, 1921.

The invention aims at rendering the continuous distillation and gasifying of fuel in an alternately operating generator to a high degree independent of the amount of moisture contained in the fuel.

When very moist fuel is gasified and distilled, as for instance in the process for producing water gas, the quantity of heat necessary for evaporating the water causing the moisture, and for superheating the generated vapors up to the temperature of the outlet gas, is so much in comparison with the rest of heat necessary for carrying out the entire process, that the latter (the heat used for distilling), appears insignificant. If for example fuel is used which is composed by weight of 45.3% moisture, 6.3% ashes, 22.1% fixed carbon, 7.4% tar and 18.9% volatile matter including vapor formed by distillation of the bituminous fuel, the heat necessary for the evaporation of the moisture and for the superheating of the vapors amounts to about 80% of the total heat required.

For this reason the proportion of moisture contained in bituminous fuel, which is to be used for continuous distillation and water gas production in an alternately operating generator, is confined to rather narrow limits.

In the blast gases, generated during the blast period, a considerable amount of sensible heat is stored up, owing to the high temperature, at which they leave the layer of coke of the generator, and also a large quantity of heat obtained by combustion of the carbon monoxide and other combustible gases contained therein. But as these blast gases also contain much nitrogen and carbon dioxide, their calorific value per cubic foot is not very important. For this reason it is not advantageous to lead great quantities of these blast gases through the fuel column or to admix them to the mixture of water gas and distillation gas. Consequently in generators working alternately the sensible heat and combustion heat of the hot blast gases are generally and chiefly utilized for heating the gasifying chamber externally. Besides that the waste heat of the alternately operated generators has been used for superheating the steam necessary for the production of water gas, but by this way only part of the waste heat can be utilized for the reason, that, as is well known, only a limited amount of steam can be employed without unfavorably influencing the quality of the gas to be produced, and that for superheating this limited amount of steam about 25% to 30% of said waste heat are sufficient.

For the said reasons the main source for covering the consumption of heat in the distilling chamber remains the one, which consists in leading the hot mixture of water gas and steam to pass directly through the layer of fuel to be gasified. But as the amount of heat which by the produced water gas can be conveyed into the gasifying chamber is determined by the proportion of fixed carbon and ashes contained in the raw fuel, in the known methods for continuously distilling and gasifying in an alternately operating producer only fuel can be used, the moisture of which does not exceed a certain determined limit, if compared with the proportion of fixed carbon contained therein.

According to the present invention the sensible heat and the combustion heat of the hot blast gases are during the blast period stored up in a heat accumulator or regenerator, and during the steam run period the produced gas (mixtures of water gas, distillation gas and steam) or part of it, after having been conducted through the said accumulator and having taken up the accumulated heat there, is carried back in a circuit into the producer in such manner, that it enters into the fuel at the junction between the coke layer, where chiefly the production of the water gas takes place, on the one hand and the fresh coal contained in the distillation chamber on the other hand. Thus the heat is by direct contact transmitted to the fuel to be distilled, the degree of efficiency being therefore a very high one.

By this way the utilization of any bituminous fuel for the distillation and gasifying in an alternately working generator is rendered possible, whilst until the present time fuel of inferior quality could only be used in producers, in which air and steam are blown in simultaneously and in which the generated producer gas together with the undecomposed water vapors are in a continuous stream carried to the upper layers, the transferring of their sensible heat therefore taking place by direct contact with the fuel. According to the present invention the same effect is in an alternately operating generator obtained by the circulation of the produced mixture of water gas, distillation gas and steam through accumulators, in which the heat formerly contained in the hot blast gases had been accumulated. By this way not only the sensible heat of the blast gases can be utilized, as has been done heretofore, but also the heat of combustion of said gases, and therefore fuel may thus be gasified, which, owing to its high proportion of moisture, could not at all be used in the usual methods of gasing or only with an unsatisfactory result.

The drawing shows by diagrammatical views in vertical section four examples of plants for carrying out the aforesaid method, which plants essentially differ from one another only by the arrangement of the heat accumulator or heat accumulators respectively, in the plant according to Fig. 1 only one accumulator being used, whilst in the plants according to Figs. 2 to 4 separate accumulators are provided for the steam and for the produced gas.

In all the figures G designates the generator containing the coke compartment K and the distillation chamber E. T is a tar separator and V a receiver to which the generated gas is conducted through a pipe 8. For a purpose to be explained hereinafter the tar separator T is made easily demountable or may be omitted altogether. From the receiver V the gas, freed of most of the tar, is led to the purifying plant and from there to the container.

Referring to Fig. 1, the generator G and the heat accumulator W are connected by a duct 1, 2, the pipe 1 being provided with a check valve 3. The lower part of the valve box is enlarged and forms a combustion chamber 3ª, which by a duct 4 is connected with the generator G. Into the pipe 4, which is provided with a stop valve 5 and which enters the generator below the coke compartment K, the air blast pipe 6 discharges into the gasification chamber, a stop valve 7 being inserted in the latter. From the heat accumulator W a pipe 12, which can be shut off by a valve 11, leads off the waste gases, whilst for admitting steam to the accumulator a pipe 13 is provided. By the pipe 10 the accumulator is connected with the duct 9, a suction apparatus S being mounted in the pipe 10, by means of which apparatus any amount of the generated gas may be driven back from the pipe 9 into the accumulator.

For operating this plant first of all the valve 7 is opened and air is blown into the generator through the duct 6. Thereby blast gases are generated, which pass upwardly around the distillation chamber E, that is outside of it, in the direction of the arrows drawn in dotted lines through the duct 1 and the opened valve 3 into the combustion chamber 3ª, into which air is entering through the pipe 4, the valve 5 having been opened for this purpose. The burning gases pass from there through the pipe 2 into the heat accumulator containing chamotte or any other refractory bricks of appropriate kind, to which they are transmitting their heat. After this they are drawn off through the pipe 12, the valve 11 being open. For starting the gasifying the valves 3, 7 and 11 are to be closed and steam is introduced through the pipe 13 into the accumulator. The steam is flowing in the direction indicated by the arrows in full lines through the ducts 2, 4, into the lower part of the generator, entering it under the fuel column. The mixture of water gas and steam generated, there effects the distillation of the fuel in the chamber E and from there passes through the pipe 8, the tar separator T and the receiver V into the duct 9.

According to the most essential feature of the present invention the gases thus generated are entirely or partly led back into the apparatus in such manner, that a closed circuit is established, in which for the purpose of conveying the heat stored up in the accumulator from the latter into the distillation chamber said gases repeatedly pass through the accumulator as well as through the distillation chamber, but not through the coke compartment which is the incandescent fuel zone. For this purpose the steam is shut off, valve 5 is closed and valve 3 opened again. Now by the action of the blower S the generated gas is sucked from the duct 9 and driven back into the heat accumulator W, from where, after being heated up, it returns in the direction of the bipinnated arrows through the ducts 2, 1, to the generator, entering the fuel at the junction of the incandescent coke or water gas generating compartment and of the distillation chamber.

As is seen, the generated gas is thus caused to circulate several times without ever passing through the incandescent fuel zone.

The plant shown in Fig. 2 is provided with two heat accumulators, the one of which, $W_1$, is intended for superheating the generated gas and the other, $W^2$, for superheating the steam. The accumulator of secondary regenerator $W_2$ is by a flue 15, in which a stop valve 14 is mounted, connected with the accumulator or primary regenerator $W_1$ and by the duct 18 with the generator. The accumulator $W_1$ is provided with a special pipe 17 for introducing secondary air, which can be shut off by means of the valve 16. As far as the other connections are concerned the arrangement is identical with that according to Fig. 1. The operation of this plant differs from the first one in that the blast gases are burnt in the accumulator $W_1$ by the secondary air entering through the pipe 17, and are drawn from there through the flue 15 into the accumulator $W_2$. The accumulator $W_1$ is therefore heated to a higher degree than the accumulator $W_2$. For initiating the gassing period the valve 14 of the flue 15 is to be closed and steam to be admitted into the accumulator $W_2$, from which it is passed through the pipe 18 and admitted to the coke compartment of the generator, whilst the circulating mixed gas, owing to the function of the suction apparatus S, is led through the duct 10 into the accumulator $W_1$, from where through the pipe 1 it enters directly into the distillation chamber of the generator without passing through the coke compartment of the latter. In this operation the steam is heated to a lower degree than the mixed gas.

As is shown by Fig. 3, the accumulator or primary regenerator $W_1$ may be placed within the generator blast itself, the combustion of the generator gases in this case being also effected in the accumulator $W_1$, for which purpose the pipe 17 with the valve 16 admitting secondary air is arranged sidewise. The operation is exactly the same as has been described for the plant according to Fig. 2 and the working may easily be understood by following the directions indicated by the arrows.

In some cases it may be advantageous, to alter the proceeding and the arrangement shown in Figs. 2 and 3 inasmuch, as the steam is led through the hotter accumulator and the circulating gas through the cooler one. A plant, in which the manner of action of the accumulators is thus reversed, is shown in Fig. 4. In this operation the steam is heated to a higher degree than the mixed gas. The accumulator $W_1$, which serves for the heating up of the circulation gases, is on the one hand by the pipe 10 connected with the duct 9, through which the mixed gas passes, and on the other hand by the duct 18 with the distillation chamber of the producer. The duct 18 can be shut off by the check valve 19. The connection of the accumulator $W_2$ with the generator is the same as indicated for Fig. 1. For generating gas the valves 3 and 14 are closed and the steam entering at 13 is led through the accumulator $W_2$ and through the ducts 2, 4, under the coke compartment of the generator, whilst the circulating gases pass through the duct 10, the accumulator $W_1$ and the pipe 18 into the distillation chamber E.

It is to be seen, that in plants arranged according to Figs. 2, 3 and 4, the admission of steam to the coke compartment and repeated circulation of the generated gas can be effected simultaneously.

The quantities of tar melting at low temperatures (primary tar) generated during such gas production, are rather considerable. The method of producing the gas according to the present invention offers the possibility of utilizing this primary tar directly for the carburation of the generated gas, this carburation being effected by letting circulate the vapors of the primary tar together with the mixture of water gas, distillation gas and steam through the accumulator or accumulators respectively. For this purpose the tar separator T is to be dismounted from the pipe 8. The circulating tar vapors are now decomposed in the accumulators and the gas is carbureted by the gaseous products of this decomposition. Thus the decomposition of the primary tar is effected in a most simple manner, which easily admits of regulation without unfavorably influencing the gasifying process itself. The yield of gas and its calorific value are thereby augmented, whilst the remainder of tar, which is not decomposed, is of about the same quality as the common coal tar.

It has been proposed already to use the tar vapors generated in the process of distillation and gasifying directly for augmenting the quantity of the gas. But all the endeavors aiming at this result, in contradistinction to the method according to the present invention, are based on the idea of conducting the distillation process at higher temperatures, thus obtaining a smaller quantity of tar, which also to a higher degree resembles the coal tar, part of the primary tar disengaged in the distillation chamber being directly after its generation decomposed by superheating.

I wish it to be understood that I do not desire to be limited to the exact details as shown in the drawing and described above, for obvious modifications will occur to a person skilled in the art. So for instance instead of heating up the second accumulator by conducting the burning hot blast gases from the first accumulator through a flue into the second, the arrangement may also be such, that part of said hot blast gases is led directly into the second accumulator for being burned there.

I claim:

1. A process for the total gasification of bituminous materials in an alternate blast and gas making water gas process whereby mixed water gas and distillation gases are produced, which comprises distilling bituminous material in a distillation zone, alternately blasting with air and gasifying with steam the residual material from said distillation zone in a gasification zone, withdrawing the blast gases generated during the air blast period, igniting said blast gases, withdrawing a portion of the mixed gas formed in the process, imparting a portion of the sensible heat of the blast gases to said mixed gas, passing said mixed gas through the distillation zone only, imparting a portion of the sensible heat of the blast gases to steam, superheating the steam to a lower temperature than that to which the mixed gas is superheated, and passing said steam through the gasification zone to form water gas.

2. A process for the total gasification of bituminous fuels in an alternate blast and gas making water gas process whereby mixed water gas and distillation gases are produced, which comprises distilling bituminous material in a distillation zone, alternately blasting with air and gasifying with steam the residual material in said distillation zone in a gasification zone, withdrawing the blast gases generated during the air blast period, igniting said blast gases, withdrawing a portion of the mixed gases formed in the process, imparting a portion of the sensible heat of the blast gases to said mixed gases, passing said mixed gases through the distillation zone only, imparting a portion of the sensible heat of the blast gases to steam, superheating the steam to a different temperature than that to which the mixed gases are superheaed, and passing said steam through the gasification zone to form water gas.

3. A process for the total gasification of bituminous fuels in an alternate blast and gas making water gas process whereby mixed water gas and distillation gases are produced, which comprises distilling bituminous material in a distillation zone, alternately blasting with air and gasifying with steam the residual material in said distillation zone in a gasification zone, withdrawing the blast gases generated during the air blast period, igniting said blast gases, passing said ignited gases through a primary and then through a secondary heat exchanger, withdrawing a portion of the mixed gases formed in said process, passing said mixed gases through the primary heat exchanger and therein imparting a portion of the sensible heat of the blast gases to said mixed gases, passing said mixed gases through the distillation zone only, passing steam through the secondary heat exchanger and therein imparting a portion of the sensible heat of the blast gases to the steam, and passing said superheated steam through the gasification zone to form water gas.

4. In a system for the total gasification of bituminous materials, a generator comprising a gasification and a distillation zone, a regenerator surrounding said distillation zone, a second regenerator, a blast gas conduct from said first regenerator to said second regenerator, a gas conduit from said second regenerator to said gasification zone, a second conduit to said gasification zone, a mixed gas conduit from said distillation zone, a by-pass connection from said mixed gas conduit to said first mentioned regenerator and to said distillation zone, means for passing steam through said second regenerator to said gasification zone to produce water gas.

In testimony whereof I have affixed my signature.

ALBERT BREISIG.